US007918566B2

(12) United States Patent
Abe

(10) Patent No.: US 7,918,566 B2
(45) Date of Patent: Apr. 5, 2011

(54) IMAGE DISPLAY APPARATUS, IMAGE DISPLAY METHOD, AND PROGRAM PRODUCT THEREFOR

(75) Inventor: Tsutomu Abe, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 888 days.

(21) Appl. No.: 11/675,740

(22) Filed: Feb. 16, 2007

(65) Prior Publication Data

US 2008/0018862 A1    Jan. 24, 2008

(30) Foreign Application Priority Data

Jul. 18, 2006  (JP) ................................ 2006-196229

(51) Int. Cl.
  *G03B 21/26* (2006.01)
(52) U.S. Cl. .......................................... 353/94; 353/28
(58) Field of Classification Search .................. 353/10, 353/28, 30, 90, 94, 97; 345/4, 5, 435, 626; 348/586, 590, 607
See application file for complete search history.

(56) References Cited

U.S. PATENT DOCUMENTS

| | | | | |
|---|---|---|---|---|
| 5,808,682 A * | 9/1998 | Okunoki et al. | ......... | 375/240.01 |
| 5,902,030 A * | 5/1999 | Blanchard | ........................ | 353/30 |
| 6,034,740 A * | 3/2000 | Mitsui et al. | ................... | 348/587 |
| 6,191,812 B1 * | 2/2001 | Tzidon et al. | ................ | 348/140 |
| 6,361,173 B1 * | 3/2002 | Vlahos et al. | ................... | 353/97 |
| 6,454,415 B1 * | 9/2002 | Vlahos | ............................ | 353/30 |
| 6,561,651 B1 | 5/2003 | Kubota et al. | | |
| 6,663,244 B1 * | 12/2003 | Wichner et al. | ............... | 353/122 |
| 6,775,014 B2 * | 8/2004 | Foote et al. | .................... | 356/621 |
| 6,860,604 B1 * | 3/2005 | Vlahos | ............................. | 353/28 |
| 6,945,653 B2 * | 9/2005 | Kobori et al. | ................... | 353/30 |
| 6,984,039 B2 * | 1/2006 | Agostinelli | ..................... | 353/28 |
| 7,165,844 B2 * | 1/2007 | Kobori et al. | ................... | 353/30 |
| 7,187,343 B2 * | 3/2007 | Pate | ............................... | 345/1.2 |
| 7,284,864 B2 * | 10/2007 | Kobori et al. | ................... | 353/30 |
| 7,325,933 B2 * | 2/2008 | Kaise et al. | ...................... | 353/97 |
| 2002/0113950 A1 * | 8/2002 | Vlahos | ............................. | 353/97 |
| 2003/0067587 A1 | 4/2003 | Yamasaki et al. | | |
| 2004/0070674 A1 | 4/2004 | Foote et al. | | |
| 2004/0165154 A1 * | 8/2004 | Kobori et al. | ................... | 353/69 |
| 2005/0068500 A1 * | 3/2005 | Tamura et al. | .................. | 353/28 |
| 2005/0117132 A1 * | 6/2005 | Agostinelli | ..................... | 353/122 |
| 2006/0001836 A1 * | 1/2006 | Kobori et al. | ................... | 353/30 |
| 2006/0028624 A1 * | 2/2006 | Kaise et al. | ...................... | 353/85 |
| 2006/0170871 A1 * | 8/2006 | Dietz et al. | ...................... | 353/31 |
| 2006/0256294 A1 * | 11/2006 | Kobori et al. | ................... | 353/30 |
| 2007/0109500 A1 * | 5/2007 | Kobori et al. | ................... | 353/30 |
| 2007/0273842 A1 * | 11/2007 | Morrison et al. | ............... | 353/97 |
| 2008/0106706 A1 * | 5/2008 | Holmgren et al. | ............ | 353/121 |

FOREIGN PATENT DOCUMENTS

JP      2001-290221 A    10/2001
JP      2005-033756 A    2/2005

* cited by examiner

*Primary Examiner* — Georgia Y Epps
*Assistant Examiner* — Bao-Luan Le
(74) *Attorney, Agent, or Firm* — Sughrue Mion, PLLC

(57) ABSTRACT

There is provided an image display apparatus including a display portion that displays a first image in a given display region, a projection portion that projects to superimpose a second image on the first image displayed with the display portion in the display region, an image recording portion that records the display region, and a controller that controls at least one of displaying the first image with the display portion and projecting the second image with the projection portion, on the basis of a third image of the display region obtained with the image recording portion.

9 Claims, 7 Drawing Sheets

IMAGE DISPLAY APPARATUS, IMAGE DISPLAY METHOD, AND PROGRAM PRODUCT THEREFOR

BACKGROUND

1. Technical Field

This invention relates to an image display apparatus that displays an image provided for viewers and an image display method.

2. Related Art

There are methods often used in presentations. In a method, a material (slide) image created by using presentation software of a personal computer (PC) is projected in a display region in a display medium such as a screen by a projector. In such a projector, in some cases, an image corresponding to image information sent via a network or the like from a remote place is projected in the display region by the projector, the display region in which the image is projected is recorded by a camera, and image information obtained by recording the display region with the camera is sent to the remote place.

It is to be noted that, in general, a projector called a front projection system that projects an image in the display region is used. If the image is projected in the display region by the front projection system and there is a shielding such as a human being between the projector and the display medium, the image will not be partially projected in the display region due to a shadow of the shielding. Also, if the display medium directly displays an image by itself such as a plasma display panel (PDP) or a liquid crystal panel, or if the display medium displays an image projected from the rear surface direction thereof and a printed matter such as a document or drawing, sticky note, or the like is attached to the display region thereof, the image displayed in the display region will not be visible.

SUMMARY

According to an aspect of the present invention, there is provided an image display apparatus including: a display portion that displays a first image in a given display region; a projection portion that projects to superimpose a second image on the first image displayed with the display portion in the display region; an image recording portion that records the display region; and a controller that controls at least one of displaying the first image with the display portion and projecting the second image with the projection portion, on the basis of a third image of the display region obtained with the image recording portion.

BRIEF DESCRIPTION OF THE DRAWINGS

Embodiments of the present invention will be described in detail based on the following figures, wherein.

DETAILED DESCRIPTION

Figure 1:
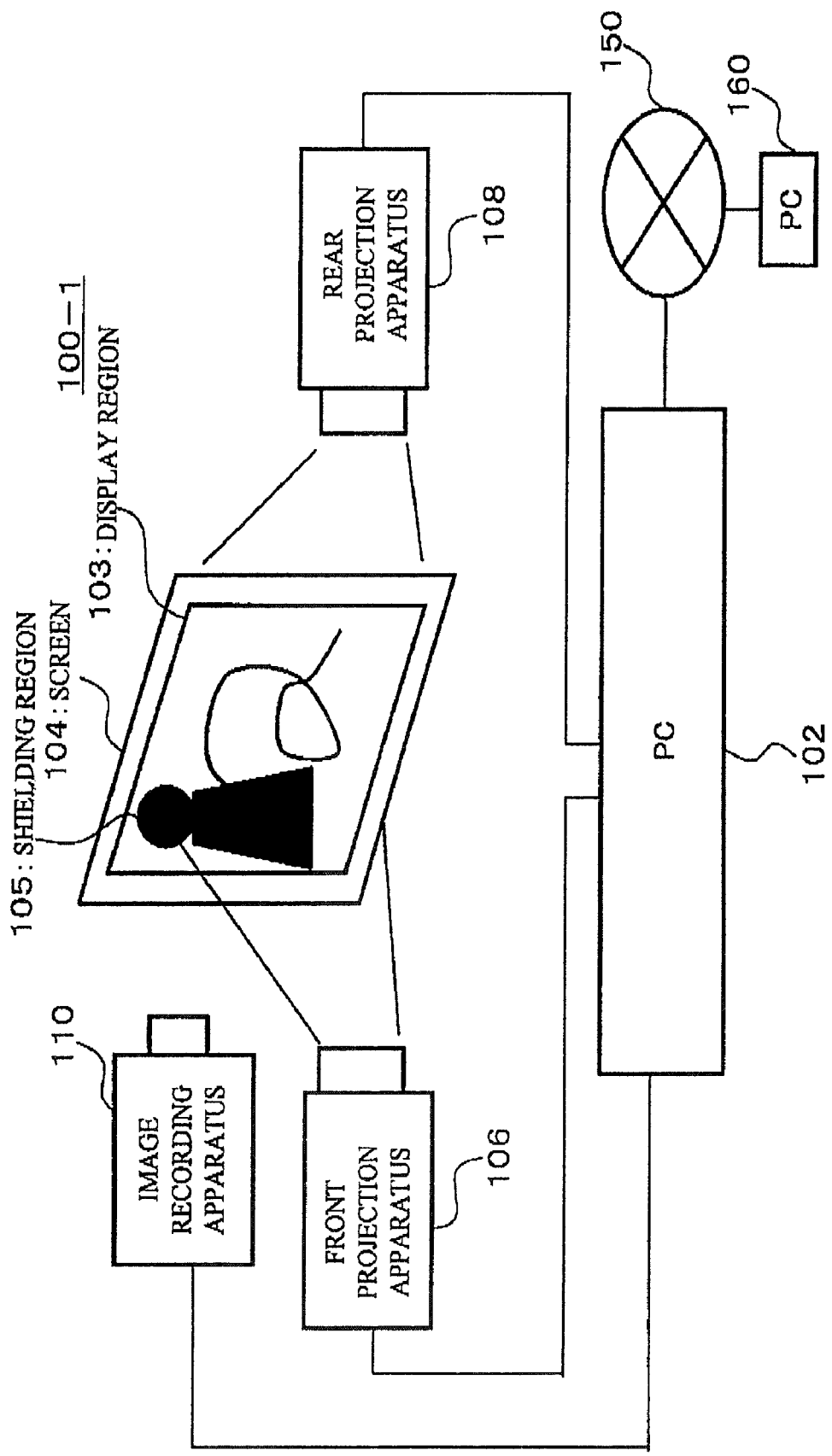
FIG. 1 shows a configuration of a first image display apparatus according to an aspect of the present invention.

A description will be hereinafter given of an image display apparatus of exemplary embodiments of the invention with reference to the attached drawings. FIG. 1 shows a configuration of a first image display apparatus according to an aspect of the present invention. An image display apparatus 100-1 shown in FIG. 1 displays an image in a presentation or the like conducted in a conference room or the like.

The image display apparatus 100-1 includes: a personal computer (PC) 102 serving as a controller and a detection portion; a screen 104; a front projection apparatus 106 serving as a display portion or a projection portion; a rear projection apparatus 108 that corresponds to the projection portion when the front projection apparatus 106 corresponds to the display portion and that corresponds to the display portion when the front projection apparatus 106 corresponds to the projection portion; and an image recording apparatus 110 serving as an image recording portion.

The PC 102 controls operations of the front projection apparatus 106, the rear projection apparatus 108, and the image recording apparatus 110. Specifically, a PC 160 connected to the PC 102 via a network 150 transmits image information to the PC 102. The image information includes position information capable of uniquely identifying a projection position in a display region 103 of the screen 104, and is added with a projection instruction. The PC 102 outputs the image information sent from the PC 160 via the network 150 to the front projection apparatus 106 and the rear projection apparatus 108 based on the projection instruction added to the image information. At this time, according to needs, the PC 102 may output either identical image information or different image information to the front projection apparatus 106 and the rear projection apparatus 108. Also, the PC 102 issues an image recording instruction to the image recording apparatus 110.

The front projection apparatus 106 is arranged on the front surface side of the screen 104, and is configured such that a projection range thereof corresponds to the display region 103 of the screen 104 by means of the control of the PC 102. The front projection apparatus 106 projects an image corresponding to the image information from the PC 102 onto the front surface of the screen 104. Meanwhile, the rear projection apparatus 106 is arranged on the rear surface side of the screen 104, and is configured such that a projection range thereof corresponds to the display region 103 of the screen 104 by means of the control of the PC 102. The rear projection apparatus 108 projects an image corresponding to the image information from the PC 102 onto the rear surface of the screen 104. The density of the material of the screen 104 is desirably uniform.

The image recording apparatus 110 is arranged on the front surface side of the screen 104, and is configured such that an image recording range thereof corresponds to the display region 103 of the screen 104 by means of the control of the PC 102. The image recording apparatus 110 records the screen 104 according to an instruction given by the PC 102.

In the image display apparatus 100-1, when the PC 102 outputs the identical image information to the front projection apparatus 106 and to the rear projection apparatus 108, the front projection apparatus 106 projects an image corresponding to the input image information onto the screen 104, and the rear projection apparatus 108 projects a reversed image of the image corresponding to the input image information onto the screen 104. Thereby, on the screen 104, the image projected by the front projection apparatus 106 and that projected by the rear projection apparatus 108 correspond to each other.

Therefore, even if there is a shielding such as a human being between the front projection apparatus 106 and the screen 104 and the image projected by the front projection apparatus 106 is not be partially projected onto the screen 104 due to a shadow of the shielding, the identical image is displayed by the rear projection apparatus 108, therefor allowing viewers to recognize the entire image.

In the image display apparatus 100-1, when a printed matter such as a document or drawing, a sticky note, or the like is attached to the screen 104 and thus part thereof is shielded, out of the image projected by the rear projection apparatus 108 as the display portion, an image corresponding to a shielding region 105 is projected by the front projection apparatus 106 serving as the projection portion. Such operations will be hereinafter described in details with reference to a flowchart.

Figure 2:
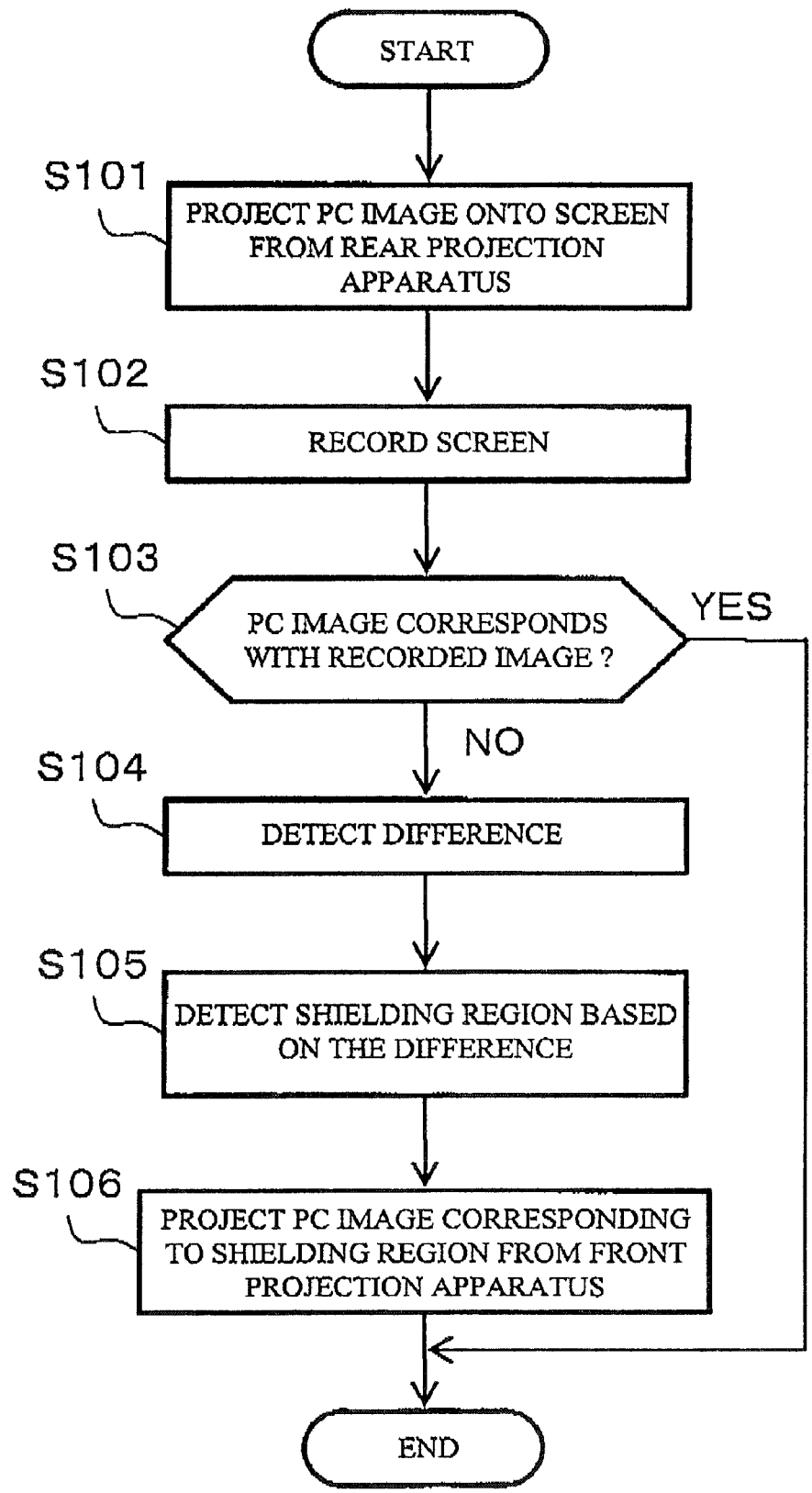
FIG. 2 is the flowchart showing the operations of the first image display apparatus.

FIG. 2 is the flowchart showing the operations when the screen 104 of the image display apparatus 100-1 is shielded. The PC 102 outputs the image information such as a document retained in a memory in advance to the rear projection apparatus 108, according to an operation instruction given by a user. The image information is of the image to be displayed on the screen 104. The rear projection apparatus 108 projects the image corresponding to the input image information (hereinafter, referred to as PC image) onto the screen 104 (S101).

Next, the PC 102 issues an image recording instruction to the image recording apparatus 110. According to the image recording instruction, the image recording apparatus 110 records the screen 104 (S102). Image information obtained by recording the screen 104 is sent to the PC 102.

When the image information is input from the image recording apparatus 110 to the PC 102, the PC 102 compares the PC image corresponding to the image information output to the rear projection apparatus 108 with an image corresponding to the image information received from the image recording apparatus 110 (hereinafter referred to as recorded image), and determines whether or not the PC image corresponds to the recorded image (S103). Here, the PC 102 enlarges or reduces the PC image and the recorded image to match the size (the number of pixels) of the PC image with that of the recorded image. In addition, the PC 102 compares pixel values of pixels in the identical positions, and counts the number of pixels in which the difference between the compared pixel values is under a given value. When so counted number of pixels occupies a given ratio out of the number of pixels in the entire image, the PC 102 determines that the PC image corresponds to the recorded image.

Figure 3A:
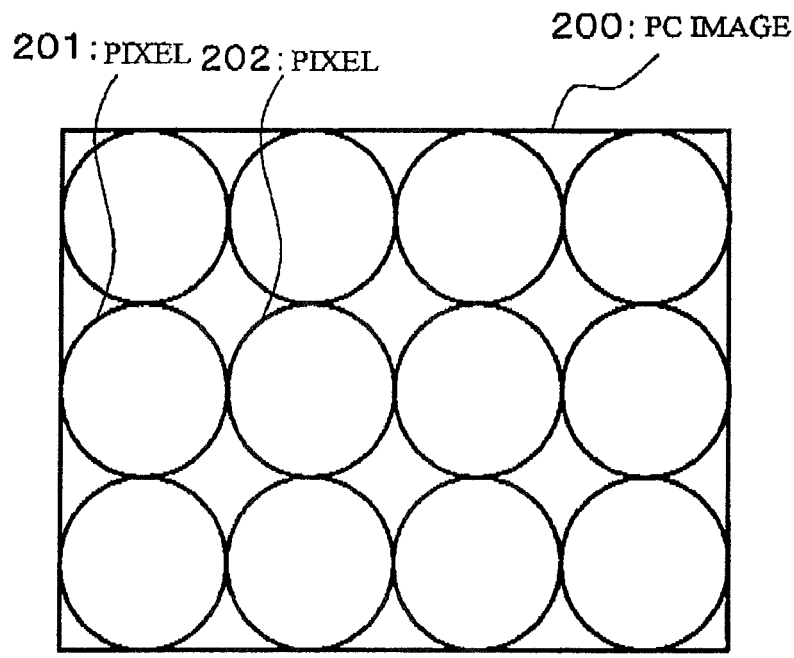
FIG. 3A and FIG. 3B are views showing examples of pixels of a PC image and those of a recorded image.
Figure 3B:
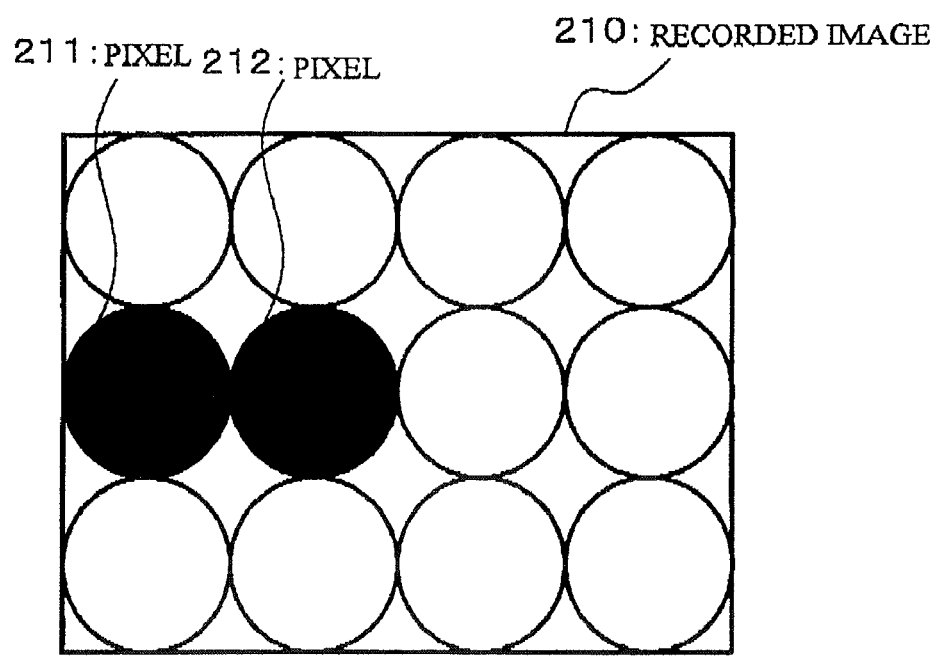

When the PC image corresponds to the recorded image, the series of operations is completed. Meanwhile, when the screen 104 is partially shielded by the shielding attached to the screen 104, the PC image does not correspond to the recorded image. In this case, the PC 102 detects the difference between the PC image and the recorded image (S104). This difference occurs when the shielding region 105 exists in the display region 103 in the screen 104. Specifically, the PC 102 compares the respective pixels in the identical positions of the PC image and the recorded image. If the difference of the compared pixel values exceeds a given value, the PC 102 determines that such compared pixels generate the difference. For example, in a PC image 200 shown in FIG. 3A and in a recorded image 210 shown in FIG. 3B, pixels 201 and 211 and pixels 202 and 212, which are respectively located in the identical positions, have a difference in the pixel values, respectively. Therefore, the PC 102 determines that the pixels 201 and 211 and the pixels 202 and 212 respectively have a difference.

In addition, the PC 102 detects the shielding region 105 based on the detected pixels having the difference (S105). Specifically, the PC 102 detects a portion of the display region 103 corresponding to an image composed of the pixel having the difference, as the shielding region 105. Furthermore, the PC 102 outputs the image information of the PC image corresponding to the shielding region 105 out of the PC image, to the front projection apparatus 106. The front projection apparatus 106 projects an image corresponding to the input image information onto the front surface of the screen 104 (S106). Accordingly, out of the image projected by the rear projection apparatus 108, the image shielded by the shielding region 105 is projected onto the shielding region 105 in the screen 104 from the front surface side, allowing viewers to recognize the entire image projected by the rear projection apparatus 108.

When the screen 104 forms an image only by projecting an image from the rear projection apparatus 108, the PC 102 may output the image information of the whole PC image to the front projection apparatus 106, instead of outputting the image information corresponding to the difference region out of the PC image to the front projection apparatus 106. In this case, the front projection apparatus 106 projects the image not only in the shielding region 105 but also in other region of the display region 103 of the screen 104 (hereinafter, referred to as transmission region).

The screen 104, however, forms the image only by projecting the image by means of the rear projection apparatus 108. Therefore, even when projection is made by the front projection apparatus 106, the image is not formed in the transmission region, but the image is formed only in the shielding region 105 where the shielding exists. Therefore, since both the front projection apparatus 106 and the rear projection apparatus 108 project the image in the transmission region, there is no blurred portion in the image.

Figure 4:
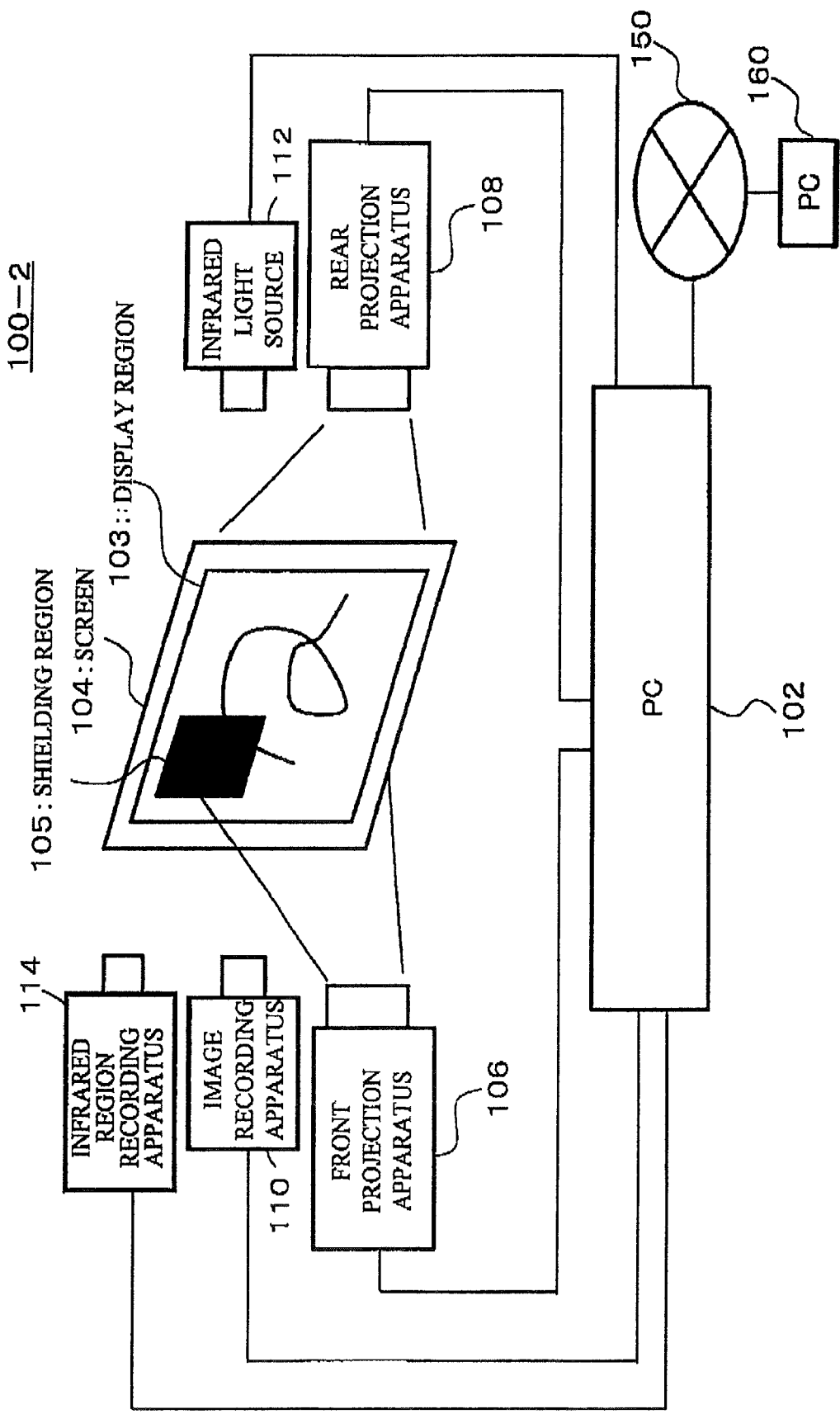
FIG. 4 shows a configuration of a second image display apparatus according to an aspect of the present invention.

FIG. 4 is a view showing a configuration of a second image display apparatus according to an aspect of the present invention. An image display apparatus 100-2 shown in FIG. 4 includes: the personal computer (PC) 102 serving as the controller and the detection portion; the screen 104; the front projection apparatus 106 serving as the projection portion; the rear projection apparatus 108 serving as the display portion; the image recording apparatus 110 serving as the image recording portion; an infrared light source 112 serving as a light source; and an infrared region recording apparatus 114 serving as a detector.

The PC 102 issues an instruction to the infrared light source 112 to emit an infrared light, and issues an image recording instruction to the infrared region recording apparatus 114. The infrared light source 112 is arranged on the rear surface side of the screen 104, and emits the infrared light toward the entire screen 104, according to the instruction by the PC 102. The infrared region recording apparatus 114 is arranged on the front surface side of the screen 104, and has a field angle corresponding to the screen 104. The infrared region recording apparatus 114 is sensitive to the infrared region. The infrared region recording apparatus 114 records the infrared light transmitting through the screen 104, according to the instruction given by the PC 102.

In the image display apparatus 100-2, when the screen 104 is partially shielded by the shielding attached, the PC 102 detects a region where the infrared light does not transmit through the screen 104, as the shielding region 105, on the basis of the image corresponding to the image information obtained by recording by the infrared region recording apparatus 114.

Furthermore, the PC 102 identifies a portion corresponding to the shielding region, out of the PC image corresponding to image information output to the rear projection apparatus 108, and outputs the image information to the front projection apparatus 106. The front projection apparatus 106 projects the image corresponding to the input image information toward the front surface of the screen 104. Accordingly, the image shielded by the shielding region 105, out of the image projected by the rear projection apparatus 108, is projected in the shielding region 105 of the screen 104 from the front surface side, thereby allowing viewers to recognize the entire image projected by the rear projection apparatus 108.

In the same manner as described above, when the screen 104 forms an image only by projecting the image by means of the rear projection apparatus 10B, the PC 102 may output the image information out of the entire PC image, instead of outputting the image information corresponding to the shielding region 105 out of the PC image to the front projection apparatus 106. The front projection apparatus 16 may project the entire PC image onto the front surface of the screen 104.

Figure 5A:
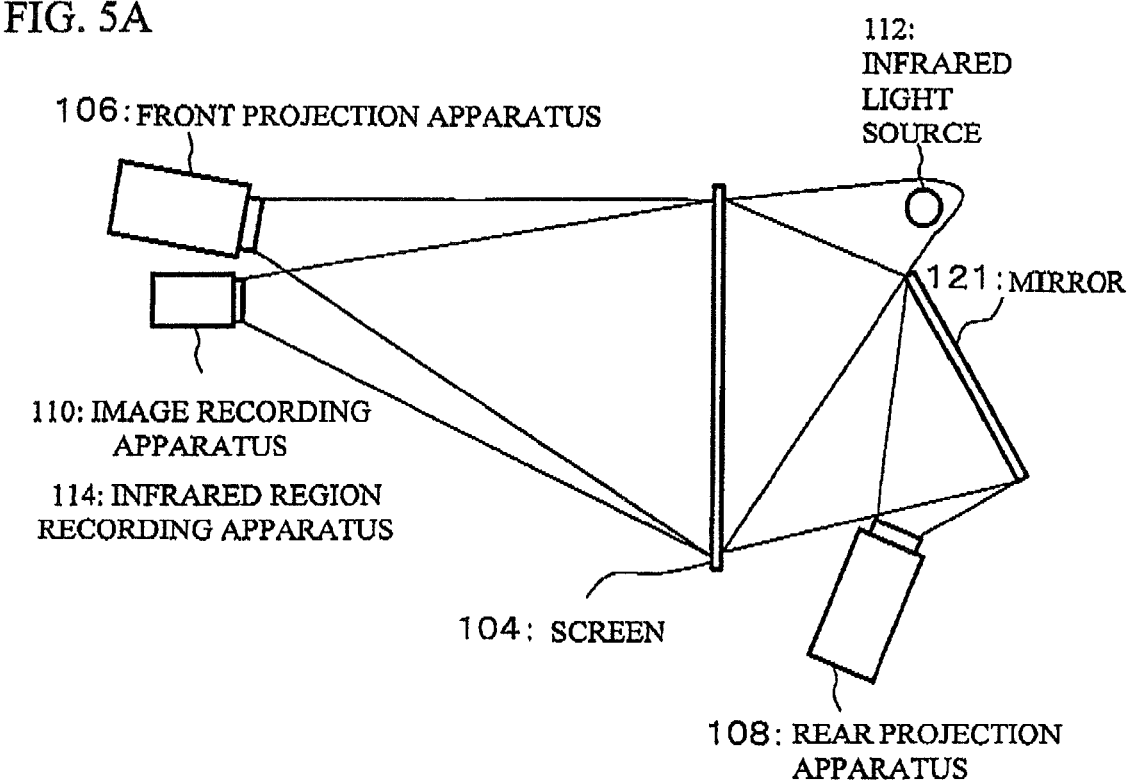
FIG. 5A and FIG. 5B are views showing arrangement examples of components of the first and second image display apparatuses.
Figure 5B:
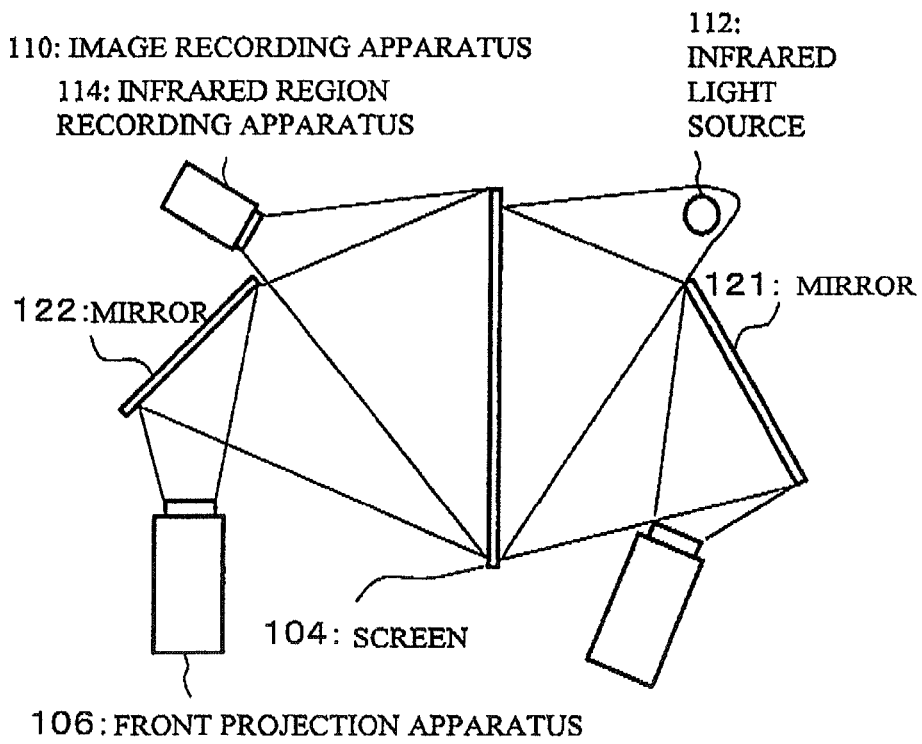

FIG. 5A and FIG. 5B are views showing arrangement examples of components of the image display apparatuses 100-1 and 100-2. The infrared light source 112 and the infrared region recording apparatus 114 are included only in the image display apparatus 100-2.

In the arrangement example shown in FIG. 5A, there is provided a mirror 121 in the projection direction of the rear projection apparatus 108. The mirror 121 corresponds to a first reflecting portion, when the rear projection apparatus 108 corresponds to the projection portion. The mirror 121 corresponds to a second reflecting portion, when the rear projection apparatus 108 corresponds to the display portion. An image reflected by the mirror 121 is projected onto the screen 104. Meanwhile, in the arrangement example shown in FIG. 5B, the mirror 121 is arranged in the projection direction of the rear projection apparatus 108, and a mirror 122 is also arranged in the projection direction of the front projection apparatus 106. The mirror 122 corresponds to the first reflecting portion, when the front projection apparatus 106 corresponds to the projection portion. The mirror 122 corresponds to the second reflecting portion, when the front projection apparatus 106 corresponds to the display portion. The image reflected by the mirror 121 is projected onto the screen 104, and the image reflected by the mirror 122 is projected onto the screen 104. Instead of the screen 104, a table, a floor or the like that transmits lights may be used. In the aforementioned case, since a main surface of the table or that of the floor is plane, a sticky note to be a shielding can be arranged thereon.

Figure 6:
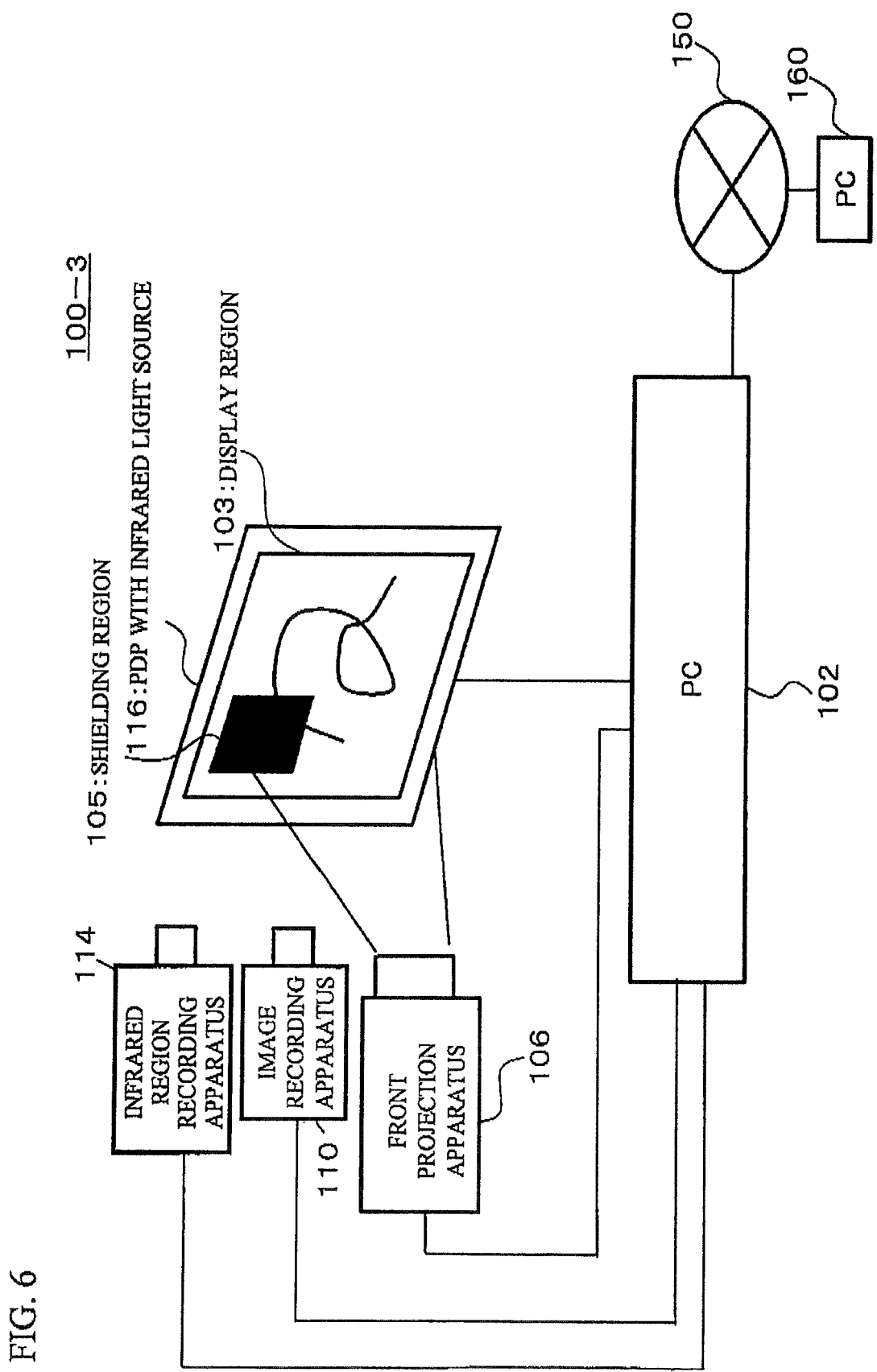
FIG. 6 is a diagram showing a configuration of a third image display apparatus according to an aspect of the present invention.
Figure 7:
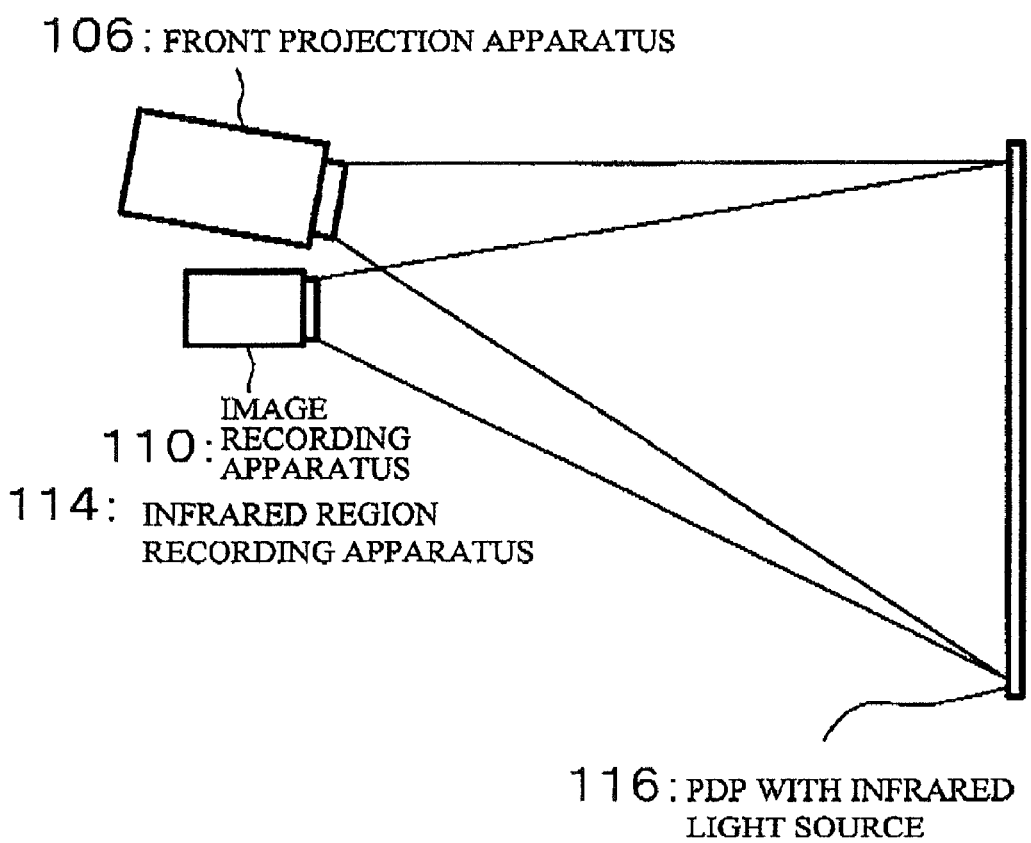
FIG. 7 is a view showing an arrangement example of components in the third image display apparatus.

FIG. 6 is a view showing a configuration of a third image display apparatus according to an aspect of the invention. An image display apparatus 100-3 shown in FIG. 6 includes: the personal computer (PC) 102 serving as the controller and the detection portion; the front projection apparatus 106 serving as the projection portion; the image recording apparatus 110 serving as the image recording portion; the infrared region recording apparatus 114 serving as the detector; and a plasma display panel (PDP) with an infrared light source 116, serving as the display portion and a light emitting portion. Out of the image display apparatus 100-3, the front projection apparatus 106, the image recording apparatus 110, the infrared region recording apparatus 114, and the PDP with the infrared light source 116 are arranged, for example, as shown in FIG. 7.

The PC 102 outputs the image information to the PDP with the infrared light source 116, and issues an instruction to emit an infrared light to the PDP with the infrared light source 116. The PDP with the infrared light source 116 displays an image corresponding to the image information input, and also emits the infrared light from the display region 103 according to the instruction given by the PC 102.

In the image display apparatus 100-3, when the PDP with the infrared light source 116 is partially shielded by an shielding attached, the PC 102 detects a region where the infrared light is shielded in the PDP with the infrared light source 116, as the shielding region 105 on the basis of the image corresponding to image information obtained by recording by means of the infrared region recording apparatus 114.

After that, in a similar manner to the image display apparatus 100-2, the PC 102 identifies the image corresponding to the shielding region 105 out of the PC image corresponding to the image information output to the rear projection apparatus 108, and outputs image information thereof to the front projection apparatus 106. The front projection apparatus 106 projects the image corresponding to the image information input, onto the screen 104. Thereby, the image, out of the image displayed by the PDP with the infrared light source 116, shielded by the shielding region 105 is projected in the shielding region 105 in the screen 104 from the front surface side, thereby allowing viewers to recognize the whole image displayed by the POP with the infrared light source 116.

In the foregoing exemplary embodiments, the screen 104 is used. However, a display medium having a plane surface such as a main surface of the table and a floor may be employed as a display region. Further, an apparatus such as a liquid crystal display with an infrared light source may be used instead of the PDP with the infrared light source 116. When the PDP or the liquid crystal display has a configuration of emitting a near-infrared region light, the infrared light source is unnecessary.

An image display method employed according to an aspect of the present invention is performed with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

CROSS-REFERENCE TO RELATED APPLICATIONS

This application is based on and claims priority under 35 USC 119 from Japanese Patent Application No. 2006-196229 filed on Jul. 18, 2006.

What is claimed is:
1. An image display apparatus comprising:
a screen on which images are projected;
a first projector arranged on front surface side of the screen that is configured such that a projection range thereof corresponds to a display region of the screen, and projects a first image to the display region from the front surface side of the screen;

a second projector arranged on the rear surface side of the screen that is configured such that a projection range thereof corresponds to the display region of the screen, and projects a second image which is a reverse of the first image with the display region of the screen from the rear side of the screen;

an image recording portion that records the display region;

a first detecting portion that compares respective pixels in identical positions of the image of the display region obtained by the image recording portion and the second image to be displayed by the second projector, and detects a portion of the display region corresponding to an image composed of pixels having a difference of the compared pixel values that exceeds a predetermined value as a shielding region; and a controller that transmits the first image and position information to the first projector to project the first image to the display region of the screen when the shielding region is detected by the detecting portion, the position information being able to uniquely identify a projection position in the display region of the screen;

wherein the first image projected from the front surface side of the screen and second image projected from the rear surface side of the screen are the same within a portion of the display region where both the first image and the second image are displayed.

2. The image display apparatus according to claim 1 comprising:
a light source that irradiates an infrared light to the display region; and
a second detecting portion that is arranged at a side of the display region, opposite to light source, and detects a transmission state of the infrared light in the display region,
wherein the second detecting portion detects the shielding region on the basis of the transmission state of the infrared light in the display region detected by the second detecting portion.

3. The image display apparatus according to claim 2, wherein the second detecting portion is a camera sensitive to an infrared region, and detects the infrared light in the display region with the use of the third image obtained by recording the display region.

4. The image display apparatus according to claim 1, further comprising a first reflecting portion that is arranged in a projection direction of the second image by the second projector and that reflects the second image projected by the projection portion to project onto the display region.

5. The image display apparatus according to claim 1, further comprising a second reflecting portion that is arranged in a projection direction of the first image by the first projector and that reflects the first image projected by the first projector to project onto the display region.

6. The image display apparatus according to claim 1, wherein the first projector projects onto the display region, the first image corresponding to image information sent from a computer connected with the image display apparatus through a network.

7. The image display apparatus according to claim 1, wherein the second projector projects onto the display region, the second image corresponding to image information sent from a computer connected with the image display apparatus through a network.

8. An image display method comprising:
projecting a first image with a display region of a screen from the front surface side of the screen using a first projector which is arranged on front surface side of the screen and is configured such that a projection range thereof corresponds to the display region of the screen;
projecting a second image which is a reverse of the first image with the display region of the screen from the rear surface side of the screen using a second projector which is arranged on rear surface side of the screen and is configured such that a projection range thereof corresponds to the display region of the screen;
recording the display region;
comparing respective pixels in identical positions of the image of the display region obtained by the image recording portion and the second image to be displayed by the second projector;
detecting a portion of the display region corresponding to an image composed of pixels having a difference of the compared pixel values that exceeds a predetermined value as a shielding region; and
transmitting the first image and position information to the first projector to project the first image to the display region of the screen when the shielding region is detected by the detecting portion, the position information being able to uniquely identify a projection position in the display region of the screen,
wherein the first image projected from the front surface side of the screen and second image projected from the rear surface side of the screen are the same within a portion of the display region where both the first image and the second image are displayed.

9. A computer readable medium storing a program causing a computer to execute a process for image display, the process comprising:
projecting a first image with a display region of a screen from the front surface side of the screen using a first projector which is arranged on front surface side of the screen and is configured such that a projection range thereof corresponds to the display region of the screen;
projecting a second image which is a reverse of the first image with the display region of the screen from the rear surface side of the screen using a second projector which is arranged on rear surface side of the screen and is configured such that a projection range thereof corresponds to the display region of the screen;
recording the display region;
comparing respective pixels in identical positions of the image of the display region obtained by the image recording portion and the second image to be displayed by the second projector;
detecting a portion of the display region corresponding to an image composed of pixels having a difference of the compared pixel values that exceeds a predetermined value as a shielding region; and
transmitting the first image and position information to the first projector to project the first image of the display region of the screen when the shielding region is detected by the detecting portion, the position information being able to uniquely identify a projection position in the display region of the screen,
wherein the first image projected from the front surface side of the screen and second image projected from the rear surface side of the screen are the same within a portion of the display region where both the first image and the second image are displayed.

* * * * *